US012743355B2

(12) United States Patent
Hicks et al.

(10) Patent No.: US 12,743,355 B2
(45) Date of Patent: Sep. 22, 2026

(54) MANAGEMENT OF TEST CASE CHAMPIONS

(71) Applicant: INTERNATIONAL BUSINESS MACHINES CORPORATION, Armonk, NY (US)

(72) Inventors: Andrew C. M. Hicks, Highland, NY (US); Ryan Thomas Rawlins, New Paltz, NY (US); Michael Terrence Cohoon, Fishkill, NY (US); John S. Werner, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/526,667

(22) Filed: Dec. 1, 2023

(65) Prior Publication Data

US 2025/0181464 A1 Jun. 5, 2025

(51) Int. Cl.
*G06F 11/00* (2006.01)
*G06F 11/263* (2006.01)

(52) U.S. Cl.
CPC .................................. *G06F 11/263* (2013.01)

(58) Field of Classification Search
None
See application file for complete search history.

(56) References Cited

U.S. PATENT DOCUMENTS

| | | | | |
|---|---|---|---|---|
| 8,561,036 | B1 | 10/2013 | Beans et al. | |
| 9,268,672 | B1 | 2/2016 | Gupta | |
| 12,282,417 | B2 * | 4/2025 | Chauhan | G06F 11/3692 |
| 2016/0085663 | A1 | 3/2016 | Best | |
| 2017/0147481 | A1 | 5/2017 | Doss | |
| 2020/0242013 | A1 * | 7/2020 | Hicks | G06F 11/3684 |
| 2021/0286710 | A1 * | 9/2021 | Hicks | G06F 11/3676 |

FOREIGN PATENT DOCUMENTS

| | | |
|---|---|---|
| CN | 112685312 A | 4/2021 |
| CN | 112783767 A | 5/2021 |

OTHER PUBLICATIONS

Google Scholar/Patents search—text refined (Year: 2025).*
Google Scholar/Patents search—text refined (Year: 2026).*

* cited by examiner

*Primary Examiner* — Christopher S Mccarthy
(74) *Attorney, Agent, or Firm* — Onyx IP Group

(57) ABSTRACT

Management of test case champions includes generating a plurality of fingerprints for a plurality of test cases, wherein each of the plurality of fingerprints is associated with one of the plurality of test cases and identifies a specific code path covered by its associated test case for a System Under Test (SUT). Based on the fingerprints and based on version control information for the SUT, one or more test cases in the plurality of test cases that cover a portion of code of the SUT that has changed are identified. Based on one or more criteria and test execution results, at least one test case of the identified one or more test cases is designated as a champion test case.

20 Claims, 5 Drawing Sheets

Figure 3:
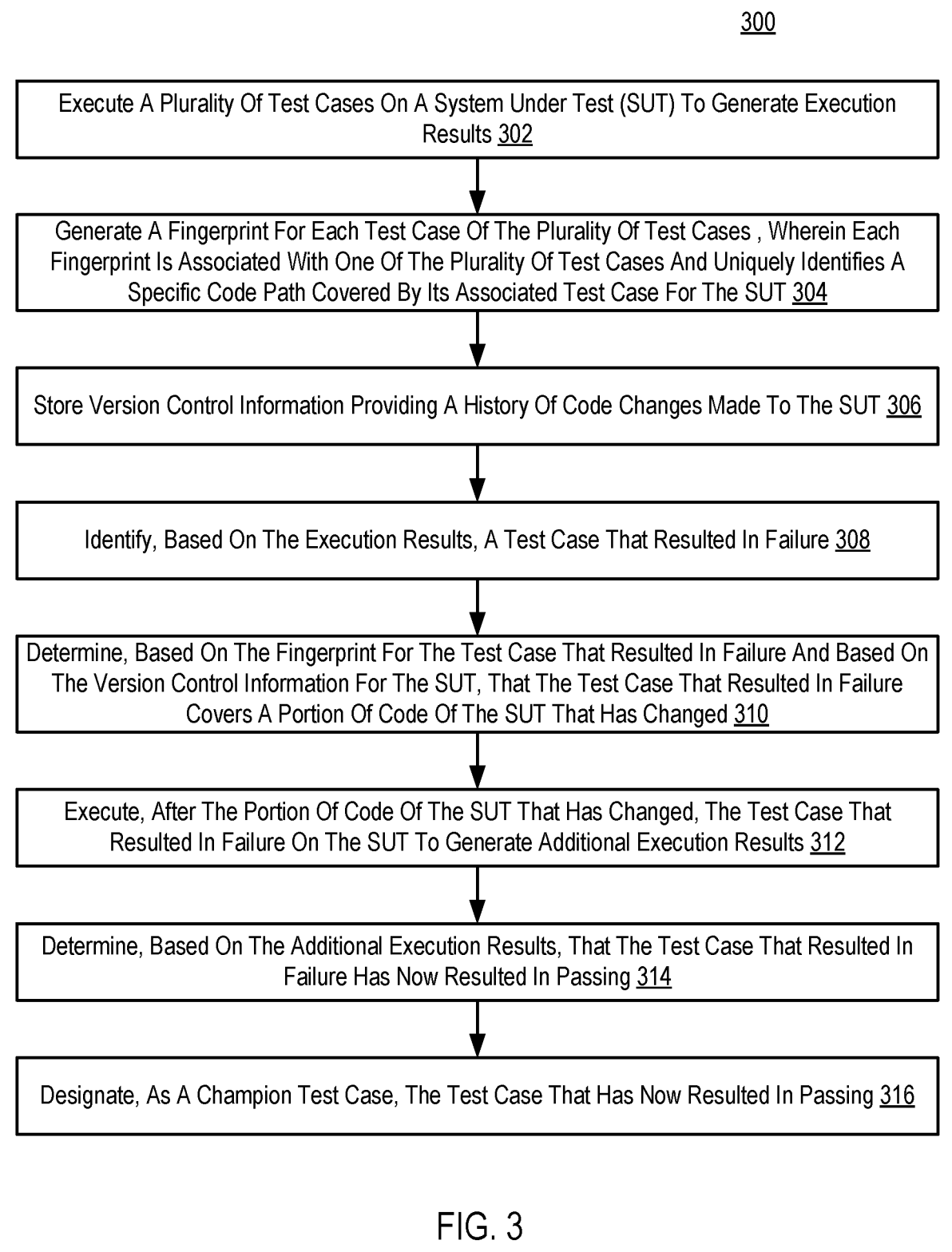

300

Execute A Plurality Of Test Cases On A System Under Test (SUT) To Generate Execution Results 302

Generate A Fingerprint For Each Test Case Of The Plurality Of Test Cases , Wherein Each Fingerprint Is Associated With One Of The Plurality Of Test Cases And Uniquely Identifies A Specific Code Path Covered By Its Associated Test Case For The SUT 304

Store Version Control Information Providing A History Of Code Changes Made To The SUT 306

Identify, Based On The Execution Results, A Test Case That Resulted In Failure 308

Determine, Based On The Fingerprint For The Test Case That Resulted In Failure And Based On The Version Control Information For The SUT, That The Test Case That Resulted In Failure Covers A Portion Of Code Of The SUT That Has Changed 310

Execute, After The Portion Of Code Of The SUT That Has Changed, The Test Case That Resulted In Failure On The SUT To Generate Additional Execution Results 312

Determine, Based On The Additional Execution Results, That The Test Case That Resulted In Failure Has Now Resulted In Passing 314

Designate, As A Champion Test Case, The Test Case That Has Now Resulted In Passing 316

Figure 4:
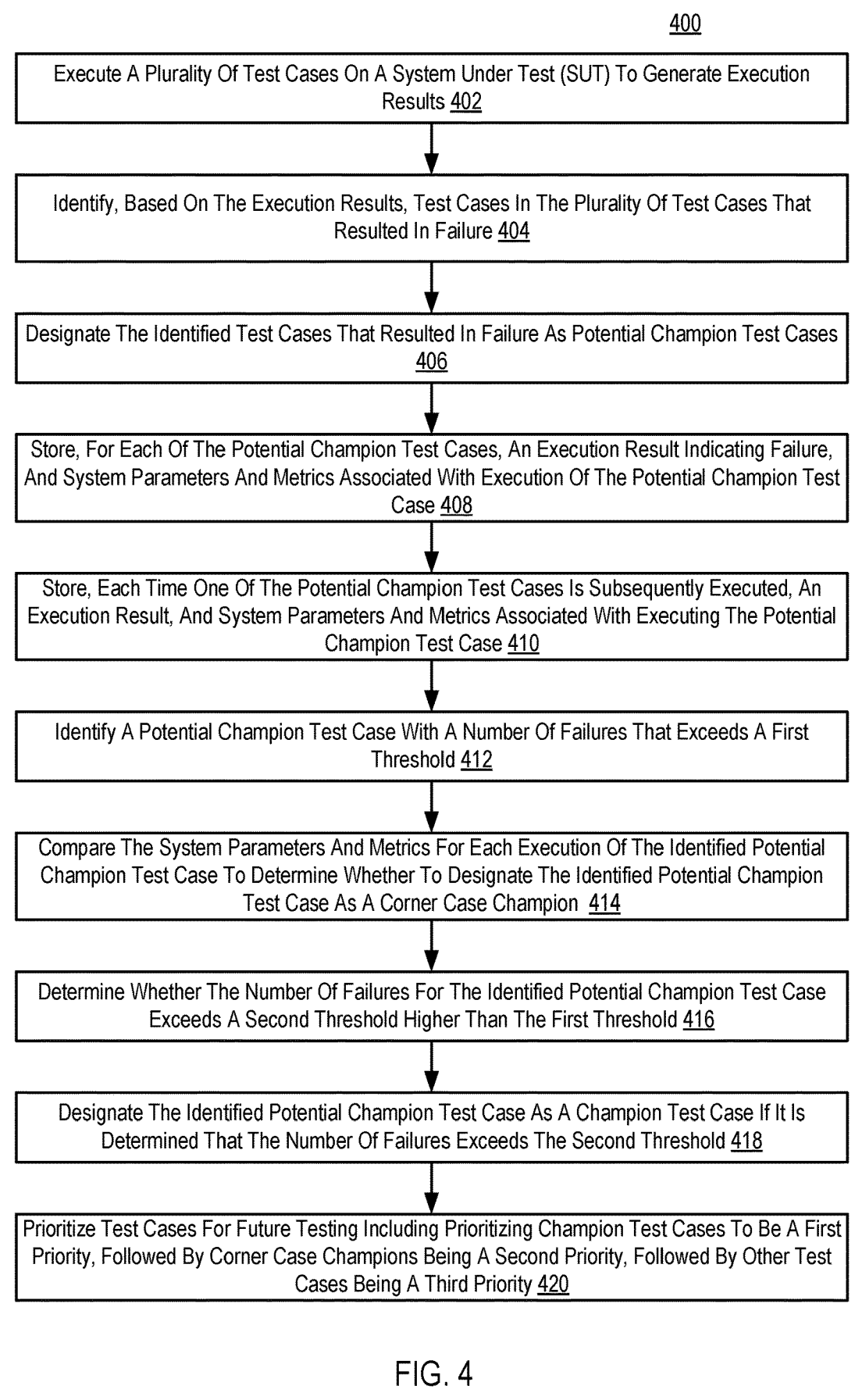

Execute A Plurality Of Test Cases On A System Under Test (SUT) To Generate Execution Results 402

Identify, Based On The Execution Results, Test Cases In The Plurality Of Test Cases That Resulted In Failure 404

Designate The Identified Test Cases That Resulted In Failure As Potential Champion Test Cases 406

Store, For Each Of The Potential Champion Test Cases, An Execution Result Indicating Failure, And System Parameters And Metrics Associated With Execution Of The Potential Champion Test Case 408

Store, Each Time One Of The Potential Champion Test Cases Is Subsequently Executed, An Execution Result, And System Parameters And Metrics Associated With Executing The Potential Champion Test Case 410

Identify A Potential Champion Test Case With A Number Of Failures That Exceeds A First Threshold 412

Compare The System Parameters And Metrics For Each Execution Of The Identified Potential Champion Test Case To Determine Whether To Designate The Identified Potential Champion Test Case As A Corner Case Champion 414

Determine Whether The Number Of Failures For The Identified Potential Champion Test Case Exceeds A Second Threshold Higher Than The First Threshold 416

Designate The Identified Potential Champion Test Case As A Champion Test Case If It Is Determined That The Number Of Failures Exceeds The Second Threshold 418

Prioritize Test Cases For Future Testing Including Prioritizing Champion Test Cases To Be A First Priority, Followed By Corner Case Champions Being A Second Priority, Followed By Other Test Cases Being A Third Priority 420

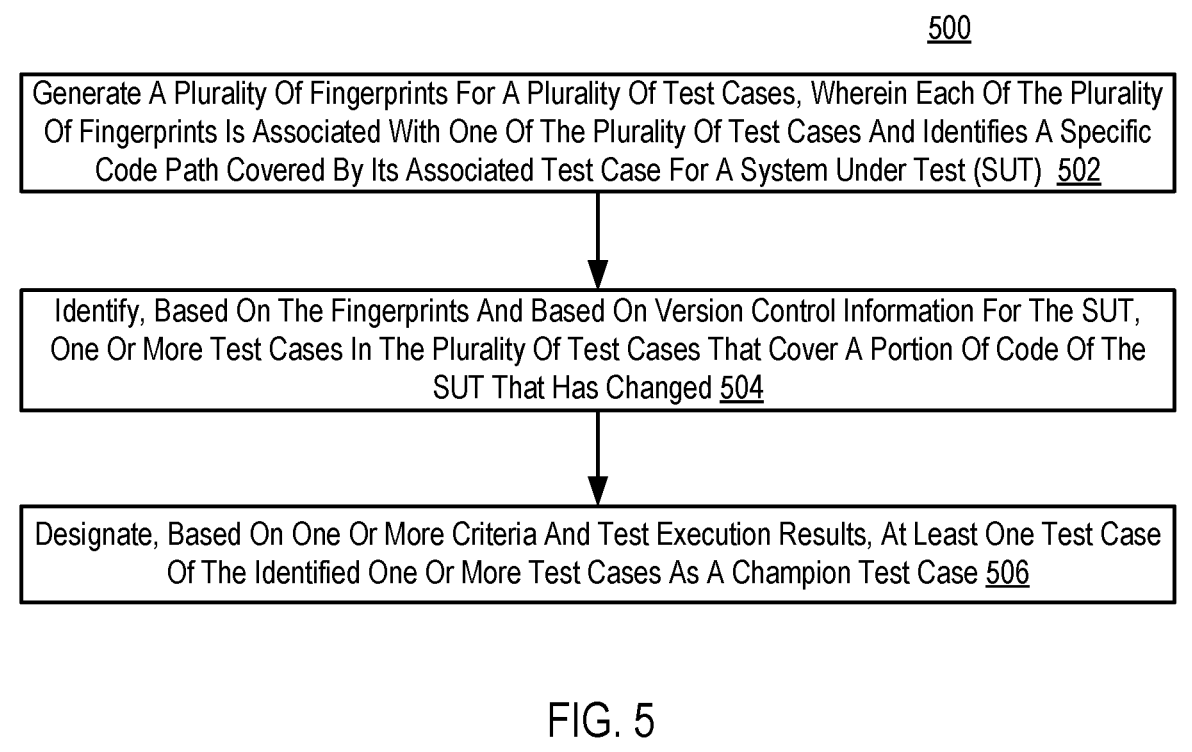

Generate A Plurality Of Fingerprints For A Plurality Of Test Cases, Wherein Each Of The Plurality Of Fingerprints Is Associated With One Of The Plurality Of Test Cases And Identifies A Specific Code Path Covered By Its Associated Test Case For A System Under Test (SUT) 502

Identify, Based On The Fingerprints And Based On Version Control Information For The SUT, One Or More Test Cases In The Plurality Of Test Cases That Cover A Portion Of Code Of The SUT That Has Changed 504

Designate, Based On One Or More Criteria And Test Execution Results, At Least One Test Case Of The Identified One Or More Test Cases As A Champion Test Case 506

FIG. 5

MANAGEMENT OF TEST CASE CHAMPIONS

BACKGROUND

The present disclosure relates to methods, apparatus, and products for management of test case champions.

SUMMARY

According to embodiments of the present disclosure, various methods, apparatus and products for management of test case champions are described herein. In some aspects, management of test case champions includes generating a plurality of fingerprints for a plurality of test cases, wherein each of the plurality of fingerprints is associated with one of the plurality of test cases and identifies a specific code path covered by its associated test case for a System Under Test (SUT). Based on the fingerprints and based on version control information for the SUT, one or more test cases in the plurality of test cases that cover a portion of code of the SUT that has changed are identified. Based on one or more criteria and test execution results, at least one test case of the identified one or more test cases is designated as a champion test case.

BRIEF DESCRIPTION OF THE DRAWINGS

FIG. 3 sets forth a flowchart of an example method for management of test case champions according to aspects of the present disclosure.

FIG. 4 sets forth a flowchart of an example method for management of test case champions according to further aspects of the present disclosure.

FIG. 5 sets forth a flowchart of an example method for management of test case champions according to additional aspects of the present disclosure.

DETAILED DESCRIPTION

Figure 1:
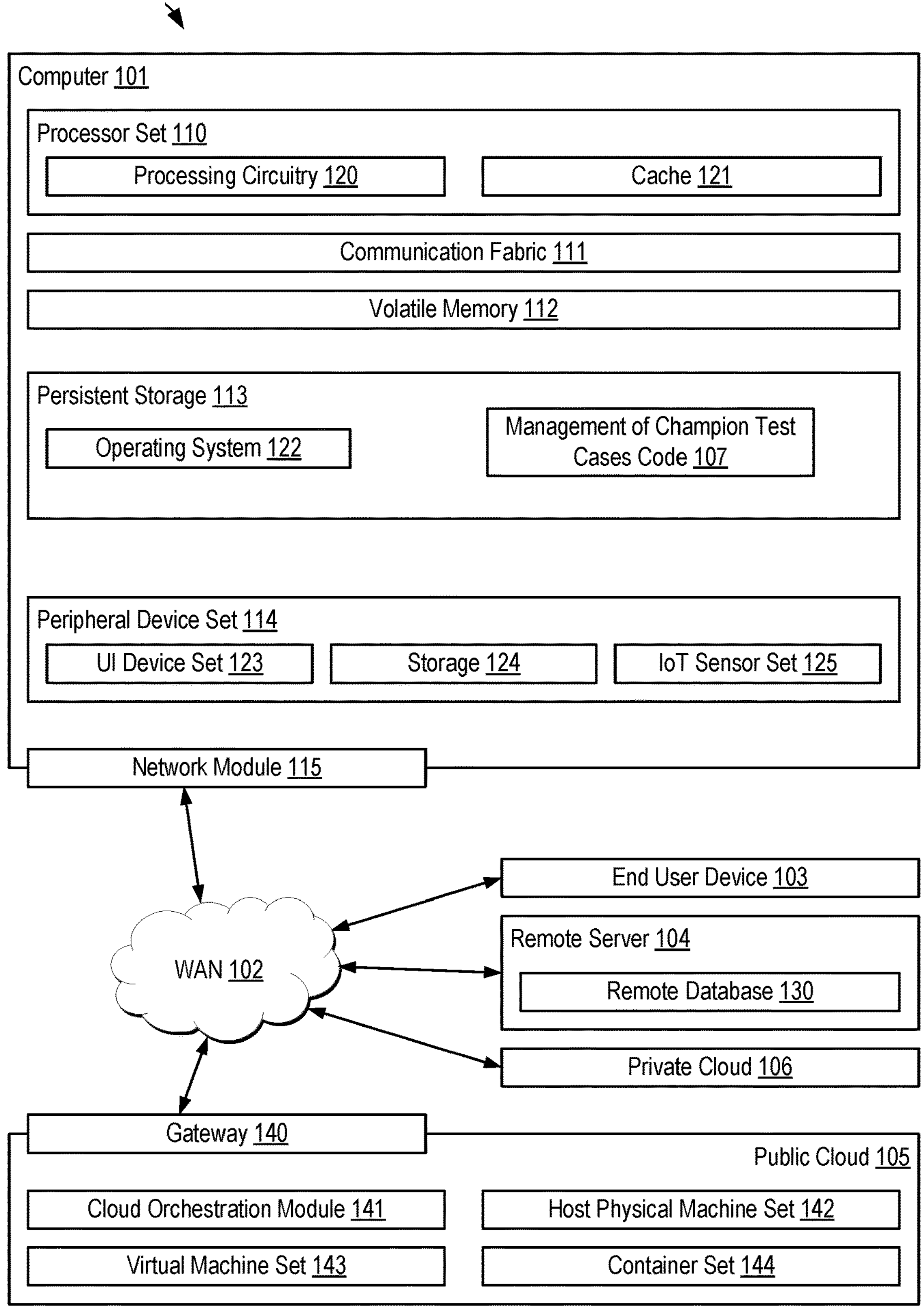
FIG. 1 sets forth an example computing environment according to aspects of the present disclosure.

Computerized devices control almost every aspect of our life, from writing documents to controlling traffic lights. However, computerized devices are error-prone, and thus require a testing phase in which the errors, or bugs, should be discovered. The testing phase is considered one of the most difficult tasks in designing a computerized device. The cost of not discovering a bug may be enormous, as the consequences of the bug may be disastrous. Additionally, a bug in hardware or firmware may be expensive to fix if it is discovered after the computerized device has shipped to customers, as patching it may require call-back of the computerized device. Hence, many developers of computerized devices invest a substantial portion of the development cycle to discover erroneous behaviors of the computerized device.

During the testing phase, a system under test (SUT) is being tested. The SUT may be, for example, a computer program, a hardware device, firmware, an embedded device, a component thereof, or the like. Testing may be performed using a test suite that includes test cases. The test suite may be reused to revalidate that the SUT exhibits a desired functionality with respect to the tests of the test suite. For example, the test suite may be reused to check that the SUT works properly after a bug is fixed. The test suite may be used to check that the bug is indeed fixed (with respect to a test that previously induced the erroneous behavior). Additionally, or alternatively, the test suite may be used to check that no new bugs were introduced (with respect to other tests of the tests suite that should not be affected by the bug fix).

Some examples disclosed herein use Combinatorial Test Design (CTD) testing. CTD is a testing methodology that seeks to optimize test space coverage for a System Under Test (SUT) through the use of automated algorithms. These algorithms identify input patterns that are most likely to locate problems in the SUT, thereby reducing the amount of time required for a tester to build test cases and an automation framework. CTD is well-adapted for projects that require numerous variations on static input vectors to properly test various system states and logic pathways, which would otherwise be extremely cumbersome for a human tester. Despite this, CTD testing techniques suffer from various drawbacks, technical solutions to which are described herein.

In some examples, inputs to a SUT may be modeled in a CTD model as a collection of attribute-value pairs. More specifically, inputs to a SUT can be modeled as a collection of attributes, each of which is eligible to take on one or more corresponding attribute values to form attribute-value pairs. For instance, if it is assumed that four different attributes A, B, C, and D are modeled, and if it is further assumed that these attributes can take on four distinct values; three distinct values; three distinct values; and two distinct values, respectively, then the total number of unique combinations of attribute values would be 4*3*3*2=72.

In some examples, a set of CTD test vectors may be generated based on the CTD model from the test space that includes all possible combinations of attribute values. In particular, in some examples, the entire Cartesian product space that contains all possible combinations of attribute-value pairs can be reduced to a smaller set of test vectors that provides complete pairwise coverage, for example, of the test space across all attribute values. For instance, in the example introduced above, the entire Cartesian product space would include 72 different combinations of attribute values. These 72 different combinations can be reduced down to a smaller set of combinations that still provide complete pairwise coverage of the Cartesian product space. In particular, the 72 different combinations can be reduced down to 12 distinct combinations that together include every possible pairwise interaction of attribute values. It should be appreciated that a set of test vectors that provides complete m-wise coverage across the attribute values can also be generated (where m>2), but would require a greater number of test vectors that increases logarithmically as m increases.

In some examples, a corresponding set of CTD test cases are generated from the set of CTD test vectors that provides the desired amount of coverage of the test space, and the set of test cases are executed to obtain execution results (e.g., a pass or fail result for each test case). In some examples, based on the execution results, a particular test case may be selected for expansion via an inverse combinatorics technique to obtain a new set of test cases designed to detect and localize a fault in the SUT (e.g., a pairwise error that occurs as a result of the interaction of a particular combination of two different attribute values).

In some examples, the above-described process can be repeated with different sets of CTD vectors. For instance, in some examples, multiple different sets of CTD vectors that each provide complete pairwise coverage of a test space can be generated. Each such set of CTD vectors may include at least one test vector that includes a different combination of attribute values than any test vector in any other set of CTD vectors. In addition, in some examples, different sets of CTD vectors that are generated may include the same CTD vector (e.g., the same exact combination of attribute values) from which the same test case is generated. Test cases corresponding to the different sets of CTD vectors can be generated and executed, and one or more of the test cases may expose one or more faults in the SUT.

A test case may be designated as a "champion" test case if it meets certain criteria. A champion test case (also referred to herein as a test case champion) may be a test case that provides an increased likelihood of fault detection in a SUT compared to other test cases of a testing system. Some examples of the present disclosure are directed to management of test case champions using a version control system. In some examples, the version control system is a Git version control system to provide Git-based management of test case champions. The management of test case champions according to some examples is an approach to test case management that uses a combination of version control tools and quality management systems to automatically detect true positive versus false positive test cases. Some examples of this approach may assume that the code or SUT is in a "non-soft" state, meaning that it is ready for production as opposed to still in the prototyping phase.

In some examples of the management of test case champions, if a test case fails and a commit (e.g., an incremental change to code of the SUT that is recorded in the version control system) is made that hits the same lines of code that the test case is correlated to, causing the test case to then pass, the test case may then be promoted as a test case champion. Some examples of the management of test case champions may use this information to prioritize these test cases in future quality assurance test suites. Conversely, if a line of code was changed for a bug fix, but no known test cases hit it, a new test case may be generated that will hit the missing coverage lines.

An example of the present disclosure is directed to a method for management of test case champions. The method includes generating a plurality of fingerprints for a plurality of test cases, wherein each of the plurality of fingerprints is associated with one of the plurality of test cases and identifies a specific code path covered by its associated test case for a System Under Test (SUT). The method includes identifying, based on the fingerprints and based on version control information for the SUT, one or more test cases in the plurality of test cases that cover a portion of code of the SUT that has changed. The method includes designating, based on one or more criteria and test execution results, at least one test case of the identified one or more test cases as a champion test case.

Examples of the method include various technical features that yield technical effects that provide various improvements to computer technology. For instance, some examples include the technical features of identifying, based on the fingerprints and based on version control information for the SUT, one or more test cases in the plurality of test cases that cover a portion of code of the SUT that has changed; and designating, based on one or more criteria and test execution results, at least one test case of the identified one or more test cases as a champion test case. These technical features yield the technical effect of improving testing efficiency and increasing the likelihood that a set of test cases will expose a fault in a SUT. These technical effects represent an improvement to debugging and fault detection computer technology by using fingerprints and version control information to help identify and prioritize champion test cases that have an increased likelihood of fault detection, which increases the efficiency and efficacy of testing.

In some examples of the method, the at least one test case is designated as a champion test case if the at least one test case initially results in failure, and then subsequently results in passing after the portion of code of the SUT covered by the at least one test case is changed. This has the technical effect of helping to distinguish between true positive and false positive test cases to increase the efficiency and efficacy of testing.

In some examples of the method, the plurality of fingerprints are generated based on a plurality of breakpoints within a specific code path covered by a corresponding test case. This has the technical effect of using fingerprints based on breakpoints to help identify champion test cases and increase the efficiency and efficacy of testing.

In some examples, the method further includes identifying, based on the version control information, a portion of code of the SUT that has been updated; identifying, based on the fingerprints, a champion test case that covers the identified portion of code that has been updated; and prioritizing the identified champion test case for execution. This has the technical effect of using fingerprints and version control information to help identify and prioritize a champion test case that will cover code that has been updated.

In some examples, the method further includes identifying, based on the version control information, a portion of code of the SUT that has been deleted; identifying, based on the fingerprints, a champion test case that previously covered the portion of code that has been deleted; and demoting the identified champion test case to a regular test case. This has the technical effect of using fingerprints and version control information to help identify and demote a champion test case that previously covered code that has been deleted so that other champion test cases may be prioritized.

In some examples, the method further includes identifying test cases in the plurality of test cases that resulted in failure; designating the identified test cases that resulted in failure as potential champion test cases; and storing, for each of the potential champion test cases, an execution result indicating failure, and system parameters and metrics associated with execution of the potential champion test case. This has the technical effect of storing information to facilitate the identification of champion test cases and corner case champions that may be prioritized in subsequent test runs.

In some examples, the method further includes storing, each time one of the potential champion test cases is subsequently executed, an execution result, and system parameters and metrics associated with executing the potential champion test case; identifying a potential champion test case with a number of failures that exceeds a first threshold; and comparing the system parameters and metrics for each execution of the identified potential champion test case to determine whether to designate the identified potential champion test case as a corner case champion. This has the technical effect of storing additional information that may be used to identify, based on a first threshold, a corner case champion that may be prioritized in subsequent test runs.

In some examples, the method further includes determining whether the number of failures for the identified potential champion test case exceeds a second threshold higher than the first threshold; and designating the identified potential champion test case as a champion test case if it is determined that the number of failures exceeds the second threshold. This has the technical effect of using a second threshold in promoting a potential champion test case to a champion test case that may be prioritized in subsequent test runs.

In some examples of the method, the plurality of test cases is generated using Combinatorial Test Design (CTD) testing that models inputs to the SUT as a plurality of attributes, and wherein each attribute includes a set of attribute values. This has the technical effect of using CTD methods to help identify input patterns that are most likely to locate problems in the SUT.

Another example of the present disclosure is directed to an apparatus for management of test case champions, which includes a processing device, and a memory operatively coupled to the processing device. The memory stores computer program instructions that, when executed, cause the processing device to generate a plurality of fingerprints for a plurality of test cases, wherein each of the plurality of fingerprints is associated with one of the plurality of test cases and identifies a specific code path covered by its associated test case for a System Under Test (SUT). The memory stores computer program instructions that, when executed, cause the processing device to identify, based on the fingerprints and based on version control information for the SUT, one or more test cases in the plurality of test cases that cover a portion of code of the SUT that has changed. The memory stores computer program instructions that, when executed, cause the processing device to designate, based on one or more criteria and test execution results, at least one test case of the identified one or more test cases as a champion test case.

Examples of the apparatus include various technical features that yield technical effects that provide various improvements to computer technology. For instance, some examples include the technical features of identifying, based on the fingerprints and based on version control information for the SUT, one or more test cases in the plurality of test cases that cover a portion of code of the SUT that has changed; and designating, based on one or more criteria and test execution results, at least one test case of the identified one or more test cases as a champion test case. These technical features yield the technical effect of improving testing efficiency and increasing the likelihood that a set of test cases will expose a fault in a SUT. These technical effects represent an improvement to debugging and fault detection computer technology by using fingerprints and version control information to help identify and prioritize champion test cases that have an increased likelihood of fault detection, which increases the efficiency and efficacy of testing.

In some examples of the apparatus, the at least one test case is designated as a champion test case if the at least one test case initially results in failure, and then subsequently results in passing after the portion of code of the SUT covered by the at least one test case is changed. This has the technical effect of helping to distinguish between true positive and false positive test cases to increase the efficiency and efficacy of testing.

In some examples of the apparatus, the plurality of fingerprints are generated based on a plurality of breakpoints within a specific code path covered by a corresponding test case. This has the technical effect of using fingerprints based on breakpoints to help identify champion test cases and increase the efficiency and efficacy of testing.

In some examples, the memory of the apparatus further stores computer program instructions that, when executed, cause the processing device to: identify, based on the version control information, a portion of code of the SUT that has been updated; identify, based on the fingerprints, a champion test case that covers the identified portion of code that has been updated; and prioritize the identified champion test case for execution. This has the technical effect of using fingerprints and version control information to help identify and prioritize a champion test case that will cover code that has been updated.

In some examples, the memory of the apparatus further stores computer program instructions that, when executed, cause the processing device to: identify, based on the version control information, a portion of code of the SUT that has been deleted; identify, based on the fingerprints, a champion test case that previously covered the portion of code that has been deleted; and demote the identified champion test case to a regular test case. This has the technical effect of using fingerprints and version control information to help identify and demote a champion test case that previously covered code that has been deleted so that other champion test cases may be prioritized.

In some examples, the memory of the apparatus further stores computer program instructions that, when executed, cause the processing device to: identify test cases in the plurality of test cases that resulted in failure; designate the identified test cases that resulted in failure as potential champion test cases; and store, for each of the potential champion test cases, an execution result indicating failure, and system parameters and metrics associated with execution of the potential champion test case. This has the technical effect of storing information to facilitate the identification of champion test cases and corner case champions that may be prioritized in subsequent test runs.

In some examples, the memory of the apparatus further stores computer program instructions that, when executed, cause the processing device to: store, each time one of the potential champion test cases is subsequently executed, an execution result, and system parameters and metrics associated with executing the potential champion test case; identify a potential champion test case with a number of failures that exceeds a first threshold; and compare the system parameters and metrics for each execution of the identified potential champion test case to determine whether to designate the identified potential champion test case as a corner case champion. This has the technical effect of storing additional information that may be used to identify, based on a first threshold, a corner case champion that may be prioritized in subsequent test runs.

In some examples, the memory of the apparatus further stores computer program instructions that, when executed, cause the processing device to: determine whether the number of failures for the identified potential champion test case exceeds a second threshold higher than the first threshold; and designate the identified potential champion test case as a champion test case if it is determined that the number of failures exceeds the second threshold. This has the technical effect of using a second threshold in promoting a potential champion test case to a champion test case that may be prioritized in subsequent test runs.

In some examples of the apparatus, the plurality of test cases is generated using Combinatorial Test Design (CTD) testing that models inputs to the SUT as a plurality of attributes, and wherein each attribute includes a set of attribute values. This has the technical effect of using CTD methods to help identify input patterns that are most likely to locate problems in the SUT.

A further example of the present disclosure is directed to a computer program product comprising a computer readable storage medium, wherein the computer readable storage medium comprises computer program instructions that, when executed generate a plurality of fingerprints for a plurality of test cases, wherein each of the plurality of fingerprints is associated with one of the plurality of test cases and identifies a specific code path covered by its associated test case for a System Under Test (SUT). The computer readable storage medium comprises computer program instructions that, when executed identify, based on the fingerprints and based on version control information for the SUT, one or more test cases in the plurality of test cases that cover a portion of code of the SUT that has changed. The computer readable storage medium comprises computer program instructions that, when executed designate, based on one or more criteria and test execution results, at least one test case of the identified one or more test cases as a champion test case.

Examples of the computer program product include various technical features that yield technical effects that provide various improvements to computer technology. For instance, some examples include the technical features of identifying, based on the fingerprints and based on version control information for the SUT, one or more test cases in the plurality of test cases that cover a portion of code of the SUT that has changed; and designating, based on one or more criteria and test execution results, at least one test case of the identified one or more test cases as a champion test case. These technical features yield the technical effect of improving testing efficiency and increasing the likelihood that a set of test cases will expose a fault in a SUT. These technical effects represent an improvement to debugging and fault detection computer technology by using fingerprints and version control information to help identify and prioritize champion test cases that have an increased likelihood of fault detection, which increases the efficiency and efficacy of testing.

In some examples of the computer program product, the at least one test case is designated as a champion test case if the at least one test case initially results in failure, and then subsequently results in passing after the portion of code of the SUT covered by the at least one test case is changed. This has the technical effect of helping to distinguish between true positive and false positive test cases to increase the efficiency and efficacy of testing.

Some examples disclosed herein are directed to Git-based management of test case champions and include automatically detecting true positive versus false positive test cases, while also handling corner cases that may involve timing and environmental issues. Some examples improve the quality of the overall SUT by prioritizing the most important test cases in future quality assurance test suites. Some examples provide a more effective and efficient testing system.

FIG. 1 sets forth an example computing environment according to aspects of the present disclosure. Computing environment 100 contains an example of an environment for the execution of at least some of the computer code involved in performing the various methods described herein, such as management of champion test cases code 107. In addition to management of champion test cases code 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and management of champion test cases code 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in management of champion test cases code 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in management of champion test cases code 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
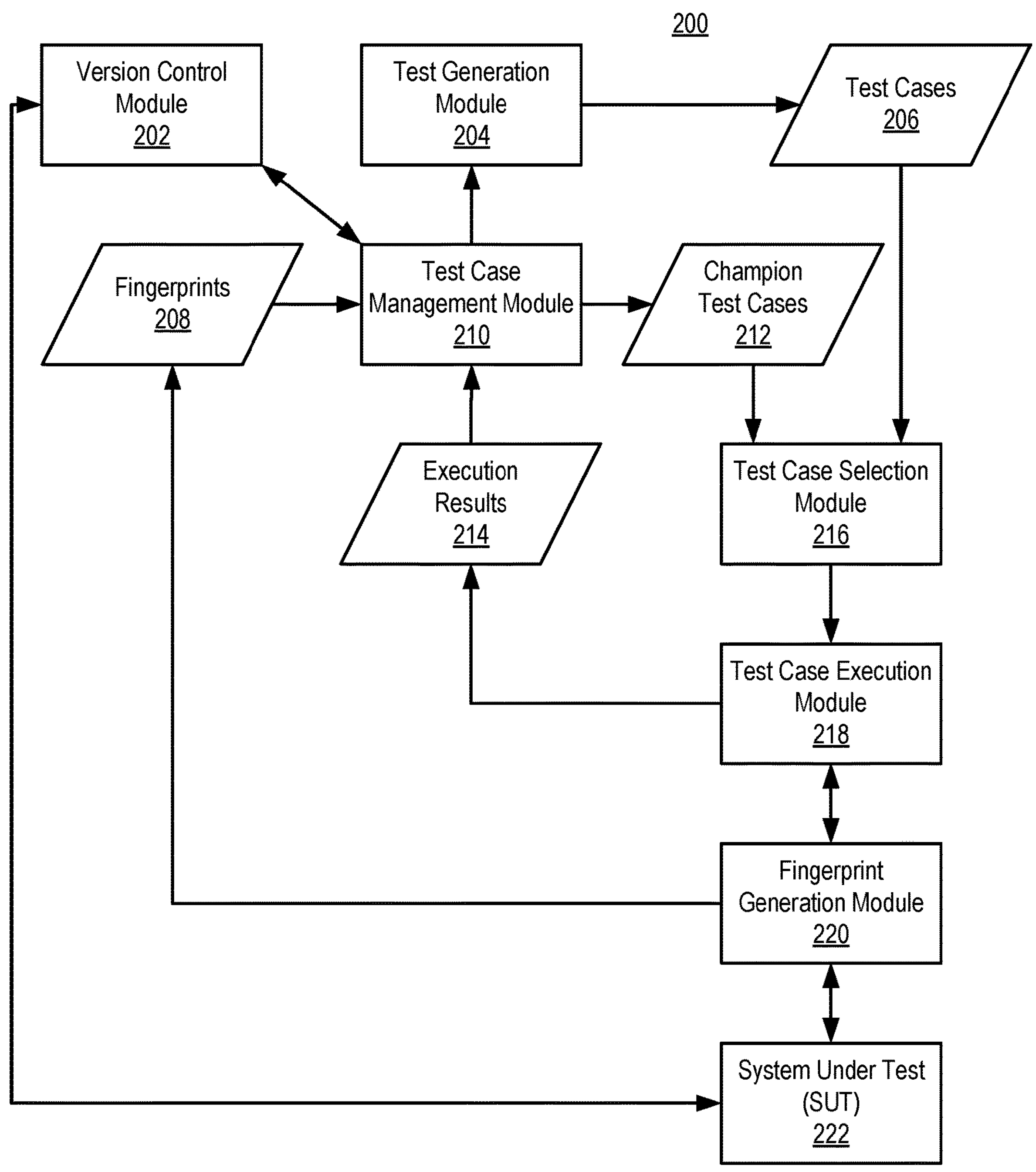
FIG. 2 sets forth an example testing system according to aspects of the present disclosure.

FIG. 2 sets forth an example testing system 200 according to aspects of the present disclosure. In some examples, testing system 200 is a CTD testing system. Testing system 200 includes version control module 202, test generation module 204, test case management module 210, test case selection module 216, test case execution module 218, and fingerprint generation module 220. It is noted that each of the modules 202, 204, 210, 216, 218, and 220 may be implemented with one or more modules, and may be included as part of the management of champion test cases code 107.

In some examples, inputs to a System Under Test (SUT) 222 are modeled in a CTD model as a collection of attribute value pairs. Any number of attributes may be used to model SUT inputs, and each attribute may take on any number of candidate attribute values. In some examples, computer-executable instructions of test generation module 204 may be executed to generate a reduced set of CTD vectors that provides a desired amount of coverage (e.g., complete pairwise coverage) of a Cartesian product space associated with the collection of attribute-value pairs. The reduced set of CTD vectors may include a significantly lesser number of combinations of attribute values than are present in the Cartesian product space, but may nonetheless provide the desired amount of coverage of the Cartesian product space (e.g., complete pairwise coverage). In example embodiments, a binary decision diagram or the like may be used to perform the reduction and identify the set of CTD vectors that provides the desired amount of coverage (e.g., complete pairwise coverage). In some examples, computer-executable instructions of test generation module 204 may be executed to generate, from the set of CTD test vectors, a corresponding set of test cases 206 (i.e., a respective corresponding test case for each CTD vector).

Each test case in the set of test cases 206 may be designed to test the interactions among the particular combination of attribute values represented in a corresponding CTD vector of the set of CTD vectors. A set of CTD test vectors and their corresponding test cases may, at times herein, be described and/or depicted interchangeably. In some examples, test cases 206 include suites of test cases available to verify the correctness of the SUT 222. Each test case may specify an input to be applied to the SUT 222 and the expected response that should be returned in response to this input (to indicate its correct operation). The test cases 206 may be organized into sets (e.g., test suites), for example, with each test suite being for a different component of the SUT 222.

Computer-executable instructions of test case selection module 216 may be executed to select particular ones of the test cases 206 and/or champion test cases 212 for execution. Computer-executable instructions of test case execution module 218 may be executed to execute the selected test cases and generate execution results 214. Test execution module 218 controls execution of the selected test cases, and for each test case, this involves the application of the corresponding input to the SUT 222. In response thereto, the SUT 222 returns a corresponding output to the test execution module 218. The test execution module 218 determines the result of the test case by comparing its output with the corresponding expected response (extracted from a file, for example). The result of the test case (i.e., positive when the two values match and negative otherwise) is saved into a log. For example, this may be achieved by means of a standard Test Tracking Tool (TTT). The results of the (current) run of the test cases are available in the log for analysis. In some examples, based on the execution results 214 from executing the set of test cases 206, one or more of the test cases 206 may expose a fault in the SUT 222 (e.g., a pairwise error that occurs as the result of the interaction of a particular combination of two different attribute values). In some examples, the above-described process may be repeated with different sets of CTD test vectors.

In an example, computer-executable instructions of fingerprint generation module 220 may be executed to generate fingerprints 208. In some examples, fingerprints 208 include a fingerprint for each of the test cases that is run on the SUT 222, along with a reference to where copies of the test case are located throughout the test infrastructure, similar to an index in a book. In some examples, each fingerprint uniquely identifies a specific code path covered by a corresponding test case. In some examples, for each test case that is run, fingerprint generation module 220 determines the code path traversed during execution and generates a fingerprint for the test case based at least in part on the code path. The test cases may be executed on source code for the SUT 222, and inputs to the source code to be tested may be modeled as a collection of attribute-value pairs. As such, in some examples, each test case may test the operation of the source code of the SUT 222 with respect to a particular combination of attribute values. In some examples, the fingerprint generation module 220 may generate fingerprints for each executed test case based at least in part on the code path traversed by the source code covered by the corresponding test case. In some examples, the fingerprint generation module 220 generates a fingerprint that identifies not only breakpoints encountered during traversal of a code path and the number of times each such breakpoint is encountered, but also the order in which the encounters occur. Thus, if execution of two different test cases results in code paths that encounter the same breakpoints for the same number of times but in different orders, the respective fingerprint generated for each test case will uniquely identify the particular order in which breakpoint encounters occur for that test case.

In some examples, as test cases 206 are executed and execution results 214 are generated, computer-executable instructions of test case management module 210 may be executed to determine, based on the execution results 214, whether any test case satisfies one or more criteria for designation as a champion test case. The criteria may include, for example, whether a particular test case has exposed a fault when executing the set of test cases as part of a current iteration; whether the test case has exposed more than a threshold number of faults; whether the test case has exposed a fault more than a threshold percentage of the times the test case is executed; or the like. In some examples, test case management module 210 also uses version control information from version control module 202 as part of the criteria for determining whether a particular test case is to be designated as a champion test case. As an example, if a test case fails and the version control information indicates that a commit (e.g., an incremental change to code of the SUT 222 that is recorded in the version control module 202) was subsequently made that hits the same lines of code that the test case is correlated to, causing the test case to then pass, the test case may then be promoted as a test case champion. In some examples, version control module 202 uses a Git version control system. The test cases that are designated as champion test cases are represented by champion test cases 212.

If it is determined by test case management module 210 that a particular test case is to be designated as a champion test case, the test case management module may generate champion test case data corresponding to the champion test case. The champion test case data may include metadata associated with the champion test case. The metadata may include, for example, an indicator that identifies the test case as a champion test case and a weight applied to the champion test case. The metadata may also include a fingerprint from fingerprints 208 that corresponds to the champion test case.

In some cases, the test case selection module 216 may select certain test cases for execution based on the metadata included in the champion test case data such as, for example, a weight assigned to a champion test case and/or a fingerprint associated with the champion test case. The test case selection module 216 may also make this selection based on version control information from version control module 202. For example, if the version control information indicates that a particular portion of code of the SUT 222 has changed recently, the test case selection module 216 may examine the fingerprints 208 of the champion test cases 212 to identify one or more champion test cases to run that cover that particular portion of code.

Some examples disclosed herein also address several corner cases. For example, test cases may fail due to timing windows while the code is being updated organically, making it difficult or impossible to distinguish environmental versus test case versus code problems. There may also be situations where both a test case problem and a false positive are happening at the same time. Additionally, timing or environmental issues can cause a test case's output to be unreliable, making it difficult to determine if the failure is genuine or not.

To address these issues, some examples use additional metrics, including the test case fingerprints 208, to correlate updates made to the SUT 222 as indicated by version control module 202 with the suite of test cases being run in regression suites. This helps to determine if failing test cases were driving the recently changed paths in the system and automatically flag the failures as genuine defects. If the set of test cases begin to pass in subsequent regression test runs, then this set of test cases may be promoted as test case champions. Additionally, the test cases may be stored in the version control (e.g., version control module 202), so that the system 200 may correlate changes to software code of the SUT 222 to changes in the test case's code. In these scenarios where both the software and test cases were changed at the same time, test case results can be reviewed to see if successes or failures are a result of proper test case execution of the SUT 222 or if either of the changes introduced an issue.

FIG. 3 sets forth a flowchart of an example method 300 for management of test case champions according to aspects of the present disclosure. In a particular embodiment, the method 300 of FIG. 3 is performed by testing system 200 (FIG. 2) using management of champion test cases code 107. The method 300 of FIG. 3 includes executing 302 a plurality of test cases on a System Under Test (SUT) to generate execution results. The method 300 further includes generating 304 a fingerprint for each test case of the plurality of test cases, wherein each fingerprint is associated with one of the plurality of test cases and uniquely identifies a specific code path covered by its associated test case for the SUT. In some examples, the fingerprints in method 300 are generated based on a plurality of breakpoints within a specific code path covered by a corresponding test case. The method 300 further includes storing 306 version control information providing a history of code changes made to the SUT over time.

The method 300 further includes identifying 308, based on the execution results, a test case that resulted in failure. The method 300 further includes determining 310, based on the fingerprint for the test case that resulted in failure and based on the version control information for the SUT, that the test case that resulted in failure covers a portion of code of the SUT that has changed. The method 300 further includes executing 312, after the portion of code of the SUT has changed, the test case that resulted in failure on the SUT to generate additional execution results. The method 300 further includes determining 314, based on the additional execution results, that the test case that resulted in failure has now resulted in passing. The method 300 further includes designating 316, as a champion test case, the test case that has now resulted in passing.

FIG. 4 sets forth a flowchart of an example method 400 for management of test case champions according to further aspects of the present disclosure. In a particular embodiment, the method 400 of FIG. 4 is performed by testing system 200 (FIG. 2) using management of champion test cases code 107. The method 400 of FIG. 4 includes executing 402 a plurality of test cases on a System Under Test (SUT) to generate execution results. The method 400 further includes identifying 404, based on the execution results, test cases in the plurality of test cases that resulted in failure. The method 400 further includes designating 406 the identified test cases that resulted in failure as potential champion test cases. The method 400 further includes storing 408, for each of the potential champion test cases, an execution result indicating failure, and system parameters and metrics associated with execution of the potential champion test case. In some examples, the identified test cases that resulted in failure may be designated as potential champion test cases and added to a "maybe prioritize" bucket along with the system parameters/metrics associated with that test run.

The method 400 further includes storing 410, each time one of the potential champion test cases is subsequently executed, an execution result, and system parameters and metrics associated with executing the potential champion test case. In some examples, anytime a potential champion test case is run that is in the "maybe prioritize" bucket, the system parameters/metrics are extracted, and the system logs whether the test passed or failed. The method 400 further includes identifying 412 a potential champion test case with a number of failures that exceeds a first threshold. The method 400 further includes comparing 414 the system parameters and metrics for each execution of the identified potential champion test case to determine whether to designate the identified potential champion test case as a corner case champion. In some examples, the first threshold in method 400 is a low threshold, and if this low threshold of failures or errors is reached by a potential champion test case in the "maybe prioritize" bucket, the system parameters/metrics between pass and fail tests are compared, and if a pattern is recognized that leads to failure, the identified potential champion test case may be designated as a corner case champion and/or added to a corner case champions list along with the system parameters/metrics. The corner case champion test cases may have significantly fewer failures and may be harder to identify than the test cases designated as champion test cases at 418 in method 400, but method 400 is able to identify the corner case champion test cases.

The method 400 further includes determining 416 whether the number of failures for the identified potential champion test case exceeds a second threshold higher than the first threshold. The method 400 further includes designating 418 the identified potential champion test case as a champion test case if it is determined that the number of failures exceeds the second threshold. In some examples, the second threshold is a high threshold, and the system continues tracking the potential champion test cases, and if this high threshold is exceeded, the potential champion test case may be added to a test case champions bucket regardless of other system parameters if those parameters are determined to not matter and the test case performs well in general. Method 400 further includes prioritizing 420 test cases for future testing including prioritizing champion test cases to be a first priority, followed by corner case champion test cases being a second priority, followed by other test cases being a third priority. In some examples, method 400 further includes creating two buckets of test cases: A first bucket of test cases that catch failures often (e.g., champion test cases); and a second bucket of test cases that catch errors only under special conditions (e.g., corner champion test cases).

FIG. 5 sets forth a flowchart of an example method 500 for management of test case champions according to additional aspects of the present disclosure. In a particular embodiment, the method 500 of FIG. 5 is performed by testing system 200 (FIG. 2) using management of champion test cases code 107. The method 500 of FIG. 5 includes generating 502 a plurality of fingerprints for a plurality of test cases, wherein each of the plurality of fingerprints is associated with one of the plurality of test cases and identifies a specific code path covered by its associated test case for a System Under Test (SUT). The method 500 further includes identifying 504, based on the fingerprints and based on version control information for the SUT, one or more test cases in the plurality of test cases that cover a portion of code of the SUT that has changed. The method 500 further includes designating 506, based on one or more criteria and test execution results, at least one test case of the identified one or more test cases as a champion test case.

In addition to promoting test cases to test case champions, some examples disclosed herein may demote existing test case champions when they fail to properly identify failures in the code they test. In the event a test case fails erroneously or if it is determined that there is an error in the code that the test case falsely succeeds on, that test case champion may be demoted to a regular test case and removed from a bucket of prioritized test cases. Identification of failed testing may be done in various ways, such as human interaction or the failure of other test cases that also test a particular section of code.

Over time, a software system can change as new code is introduced and patches are applied to the code base. In order to determine if test case champions are still relevant to the software system, some examples may cherry pick the failures that originally lead to the promotion of a test case to a test case champion. This would result in testing the latest code level plus the introduction of a previously resolved error. If the test case champion detects the newly, intentionally introduced issue, the test case may be validated as a test case champion. However, if the errors are not identified, this may mean that this particular test case is no longer applicable to these particular lines of code at the current software levels, and therefore, the test case champion may be demoted to a regular test case.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for management of test case champions, the method comprising:

generating a plurality of fingerprints for a plurality of test cases, wherein each of the plurality of fingerprints is associated with one of the plurality of test cases and identifies a specific code path covered by its associated test case for a System Under Test (SUT);

identifying, based on the plurality of fingerprints and based on version control information for the SUT, one or more test cases in the plurality of test cases that cover a portion of code of the SUT that has changed;

executing, on the SUT, the one or more test cases to generate test execution results, the identified one or more test cases being executed to identify a fault in the SUT;

designating, based on one or more criteria and the test execution results, at least one test case of the identified one or more test cases as a champion test case;

introducing new code to change a portion of code of the SUT previously covered by the champion test case, wherein introducing the new code includes introducing a previously resolved error;

executing the champion test case to determine whether the champion test case detects the previous resolved error;

validating the champion test case when the champion test case detects the previous resolved error; and demoting the champion test case to a regular test case when the champion test case does not detect the previous resolved error.

2. The method of claim 1, wherein the at least one test case is designated as a champion test case if the at least one test case initially results in failure, and then subsequently results in passing after the portion of code of the SUT covered by the at least one test case is changed.

3. The method of claim 1, wherein the plurality of fingerprints are generated based on a plurality of breakpoints within a specific code path covered by a corresponding test case.

4. The method of claim 1, further comprising:

identifying, based on the version control information, a portion of code of the SUT that has been updated;

identifying, based on the plurality of fingerprints, a champion test case that covers the identified portion of code that has been updated; and prioritizing the identified champion test case for execution.

5. The method of claim 1, further comprising:

identifying, based on the version control information, a portion of code of the SUT that has been deleted; and identifying, based on the plurality of fingerprints, the champion test case that previously covered the portion of code that has been deleted.

6. The method of claim 1, further comprising:

identifying test cases in the plurality of test cases that resulted in failure;

designating the identified test cases that resulted in failure as potential champion test cases; and storing, for each of the potential champion test cases, an execution result indicating failure, and system parameters and metrics associated with execution of the potential champion test case.

7. The method of claim 6, further comprising:

storing, each time one of the potential champion test cases is subsequently executed, an execution result, and system parameters and metrics associated with executing the potential champion test case;

identifying a potential champion test case with a number of failures that exceeds a first threshold; and comparing the system parameters and metrics for each execution of the identified potential champion test case to determine whether to designate the identified potential champion test case as a corner case champion.

8. The method of claim 7, further comprising:

determining whether the number of failures for the identified potential champion test case exceeds a second threshold higher than the first threshold; and designating the identified potential champion test case as a champion test case when the number of failures exceeds the second threshold.

9. The method of claim 1, wherein the plurality of test cases is generated using Combinatorial Test Design (CTD) testing that models inputs to the SUT as a plurality of attributes, and wherein each attribute includes a set of attribute values.

10. An apparatus for management of test case champions, the apparatus comprising:

a processing device; and memory operatively coupled to the processing device, wherein the memory stores computer program instructions that, when executed, cause the processing device to:

generate a plurality of fingerprints for a plurality of test cases, wherein each of the plurality of fingerprints is associated with one of the plurality of test cases and identifies a specific code path covered by its associated test case for a System Under Test (SUT);

identify, based on the plurality of fingerprints and based on version control information for the SUT, one or more test cases in the plurality of test cases that cover a portion of code of the SUT that has changed;

execute, on the SUT, the one or more test cases to generate test execution results, the one or more test cases being executed to identify a fault in the SUT;

designate, based on one or more criteria and test execution results, at least one test case of the identified one or more test cases as a champion test case;

introduce new code to change a portion of code of the SUT previously covered by the champion test case, wherein the computer program instructions that, when executed, cause the processing device to introduce the new code further cause the processing device to introduce a previously resolved error;

execute the champion test case to determine whether the champion test case detects the previous resolved error; and demote the champion test case to a regular test case when the champion test case does not detect the previous resolved error.

11. The apparatus of claim 10, wherein the at least one test case is designated as a champion test case if the at least one test case initially results in failure, and then subsequently results in passing after the portion of code of the SUT covered by the at least one test case is changed.

12. The apparatus of claim 10, wherein the plurality of fingerprints are generated based on a plurality of breakpoints within a specific code path covered by a corresponding test case.

13. The apparatus of claim 10, wherein the memory further stores computer program instructions that, when executed, cause the processing device to:

identify, based on the version control information, a portion of code of the SUT that has been updated;

identify, based on the plurality of fingerprints, a champion test case that covers the identified portion of code that has been updated; and prioritize the identified champion test case for execution.

14. The apparatus of claim 10, wherein the memory further stores computer program instructions that, when executed, cause the processing device to:

identify, based on the version control information, a portion of code of the SUT that has been deleted; and identify, based on the plurality of fingerprints, the champion test case that previously covered the portion of code that has been deleted.

15. The apparatus of claim 10, wherein the memory further stores computer program instructions that, when executed, cause the processing device to:

identify test cases in the plurality of test cases that resulted in failure;

designate the identified test cases that resulted in failure as potential champion test cases; and store, for each of the potential champion test cases, an execution result indicating failure, and system parameters and metrics associated with execution of the potential champion test case.

16. The apparatus of claim 15, wherein the memory further stores computer program instructions that, when executed, cause the processing device to:

store, each time one of the potential champion test cases is subsequently executed, an execution result, and system parameters and metrics associated with executing the potential champion test case;

identify a potential champion test case with a number of failures that exceeds a first threshold; and compare the system parameters and metrics for each execution of the identified potential champion test case to determine whether to designate the identified potential champion test case as a corner case champion.

17. The apparatus of claim 16, wherein the memory further stores computer program instructions that, when executed, cause the processing device to:

determine whether the number of failures for the identified potential champion test case exceeds a second threshold higher than the first threshold; and designate the identified potential champion test case as a champion test case if the number of failures exceeds the second threshold.

18. The apparatus of claim 10, wherein the plurality of test cases is generated using Combinatorial Test Design (CTD) testing that models inputs to the SUT as a plurality of attributes, and wherein each attribute includes a set of attribute values.

19. A non-transitory computer readable storage medium, wherein the computer readable storage medium comprises computer program instructions that, when executed:

generate a plurality of fingerprints for a plurality of test cases, wherein each of the plurality of fingerprints is associated with one of the plurality of test cases and identifies a specific code path covered by its associated test case for a System Under Test (SUT);

identify, based on the fingerprints and based on version control information for the SUT, one or more test cases in the plurality of test cases that cover a portion of code of the SUT that has changed;

execute, on the SUT, the one or more test cases to generate test execution results, the one or more test cases being executed to identify a fault in the SUT;

designate, based on one or more criteria and test execution results, at least one test case of the identified one or more test cases as a champion test case;

introduce new code to change a portion of code of the SUT previously covered by the champion test case, wherein the computer program instructions that, when executed, cause a processing device to introduce the new code further cause the processing device to introduce a previously resolved error;

execute the champion test case to determine whether the champion test case detects the previous resolved error; and demote the champion test case to a regular test case when the champion test case does not detect the previous resolved error.

20. The non-transitory computer readable medium of claim 19, wherein the at least one test case is designated as a champion test case if the at least one test case initially results in failure, and then subsequently results in passing after the portion of code of the SUT covered by the at least one test case is changed.

* * * * *